US011802771B2

United States Patent
Malson et al.

(10) Patent No.: US 11,802,771 B2
(45) Date of Patent: Oct. 31, 2023

(54) STANDARD-DEFINITION TO HIGH-DEFINITION NAVIGATION ROUTE DETERMINATION

(71) Applicant: Aptiv Technologies Limited, St. Michael (BB)

(72) Inventors: Steven G. Malson, Metamora, MI (US); James Nicholas Nickolaou, Clarkston, MI (US)

(73) Assignee: Aptiv Technologies Limited, St. Michael (BB)

( * ) Notice: Subject to any disclaimer, the term of this patent is extended or adjusted under 35 U.S.C. 154(b) by 13 days.

(21) Appl. No.: 17/650,993

(22) Filed: Feb. 14, 2022

(65) Prior Publication Data
US 2023/0140162 A1 May 4, 2023

Related U.S. Application Data

(60) Provisional application No. 63/275,810, filed on Nov. 4, 2021.

(51) Int. Cl.
*G01C 21/30* (2006.01)
*B60W 60/00* (2020.01)
*G01C 21/34* (2006.01)

(52) U.S. Cl.
CPC .......... *G01C 21/30* (2013.01); *B60W 60/001* (2020.02); *G01C 21/3453* (2013.01); *B60W 2556/40* (2020.02)

(58) Field of Classification Search
CPC . G01C 21/30; G01C 21/3453; B60W 60/001; B60W 2556/40
See application file for complete search history.

(56) References Cited

U.S. PATENT DOCUMENTS 10,969,232 B1 * 4/2021 Johnson ............... G09B 29/003
11,365,981 B2 * 6/2022 Paranjpe ............ G01C 21/3815
(Continued)

FOREIGN PATENT DOCUMENTS

JP 2020166123 A * 10/2020

OTHER PUBLICATIONS

English Translation for JP-2020166123-A (Year: 2020).*
"Extended European Search Report", EP Application No. 22197401.7, dated Mar. 28, 2023, 8 pages.

*Primary Examiner* — Rachid Bendidi
*Assistant Examiner* — Moises Gasca Alva
(74) *Attorney, Agent, or Firm* — Sawtooth Patent Group PLLC

(57) ABSTRACT

This document describes techniques, apparatuses, and systems for standard-definition (SD) to high-definition (HD) navigation route determination. An example route builder receives a navigation route generated for a host vehicle. The navigation route includes a list of waypoints generated by an SD map database. The route builder matches the list of waypoints to lane geometry data maintained in an HD map database and outputs HD navigation route to a vehicle controller. The HD navigation route includes the list of waypoints, additional waypoints, and lane geometry data. The vehicle controller can then operate the host vehicle in a roadway environment along the HD navigation route. In this way, the described techniques and systems can provide HD navigation routes required by some assisted-driving and autonomous-driving systems based on SD navigation routes.

20 Claims, 12 Drawing Sheets

(56) References Cited

U.S. PATENT DOCUMENTS

| | | |
|---|---|---|
| 2011/0208426 A1 | 8/2011 | Zheng et al. |
| 2018/0188743 A1* | 7/2018 | Wheeler ................. G06F 16/29 |
| 2018/0189578 A1* | 7/2018 | Yang .................... B60W 40/04 |
| 2019/0344795 A1 | 11/2019 | Ishioka et al. |
| 2020/0096359 A1* | 3/2020 | Sakr ................... G01C 21/3446 |
| 2021/0095976 A1 | 4/2021 | Sarkar et al. |
| 2021/0223049 A1 | 7/2021 | Johnson et al. |
| 2021/0293564 A1* | 9/2021 | Deng ................. G01C 21/3878 |

* cited by examiner

STANDARD-DEFINITION TO HIGH-DEFINITION NAVIGATION ROUTE DETERMINATION

CROSS-REFERENCE TO RELATED APPLICATION

This application claims priority to U.S. Provisional Application No. 63/275,810, filed Nov. 4, 2021, the disclosure of which is hereby incorporated by reference in its entirety herein.

BACKGROUND

Many mobile and in-vehicle navigation systems use standard definition (SD) map databases to provide navigation routes. The navigation routes generally include a list of waypoints with latitude and longitude coordinates. SD maps often include waypoints, roads, road segment names, and rough details of the lengths of road segments. This level of detail in SD maps is usually adequate for human drivers to navigate a route. However, assisted-driving and autonomous-driving systems require precise information including detailed shape geometry for each lane in order to safely navigate routes. Most SD maps, however, do not include this precise lane information found in high definition (HD) maps. Thus, a method is required to match routes based on SD maps to the precise lane level details found in HD maps. Some matching methods rely on grid-based spatial index methods to generate paths with sufficient details, but these methods require complex algorithms and a great deal of computing power to deliver the precise route.

SUMMARY

This document describes techniques, apparatuses, and systems for SD to HD navigation route determination. For example, this document describes a route builder configured to receive a navigation route generated for a host vehicle. The navigation route includes a list of waypoints generated using an SD map database. The route builder matches the list of waypoints to lane geometry data maintained in an HD map database and outputs an HD navigation route to a path planning sub-system to control the vehicle navigating the route. The HD navigation route includes the list of waypoints, additional waypoints, and lane geometry data. The vehicle path planning and trajectory control systems can then operate the host vehicle in a roadway environment following the HD navigation route.

This document also describes other operations of the above-summarized systems, techniques, apparatuses, and other methods set forth herein, as well as means for performing these methods.

This Summary introduces simplified concepts for SD to HD navigation route determination, further described below in the Detailed Description and Drawings. This Summary is not intended to identify essential features of the claimed subject matter, nor is it intended to determine the scope of the claimed subject matter.

BRIEF DESCRIPTION OF THE DRAWINGS

Details of one or more aspects of SD to HD navigation route determination are described in this document regarding the following figures. The same numbers are used throughout the drawings to reference like features and components:

FIGS. 9-1 through 9-3 illustrate example conceptual diagram of a software method to generate a path for the HD navigation route.

DETAILED DESCRIPTION

Overview

Navigation systems are an important technology for assisted-driving and autonomous-driving systems. Some of these vehicle-based systems may require a navigation system to provide navigation routes to a particular destination and provide HD map data. In contrast to SD map data, HD map data can include stop bars, lane information, finely spaced waypoints, lane centerline points, curvature data, information regarding traffic control devices, localization data, and three-dimensional data.

HD map data may be necessary for many features of vehicle-based systems, including traffic-jam assist (TJA), lane-centering assist (LCA), automatic lane change (ALC), and autonomous driving. For example, HD maps are critical for these systems to understand the roadway environment, plan navigation routes, plan driving trajectories along a roadway, and control the vehicle along a navigation route. However, many mobile and in-vehicle navigation systems do not provide navigation routes with an adequate level of detail to enable such technologies. Instead, the systems often provide navigation routes using SD map databases that generally include waypoints, roads, segment names, and rough details of the length of a segment.

In contrast, this document describes techniques for SD to HD navigation route determination. A route builder can use an existing SD map database to generate HD navigation routes for use in assisted-driving and autonomous-driving systems. The route builder can receive a navigation route generated for a vehicle. The navigation route includes a list of waypoints generated using the SD map database. The route builder can then match the list of waypoints to lane geometry data maintained in an HD map database and output the HD navigation route to a vehicle controller of the host vehicle. The HD navigation route includes the list of waypoints, additional waypoints, and lane geometry data. The vehicle controller can then operate the vehicle in a roadway environment along the HD navigation route. In this way, vehicles can use assisted-driving and autonomous-driving systems with existing SD based navigation systems.

This section describes just one example of how the described techniques and systems can perform SD to HD navigation route determination. This document describes other examples and implementations.

Operating Environment

Figure 1:
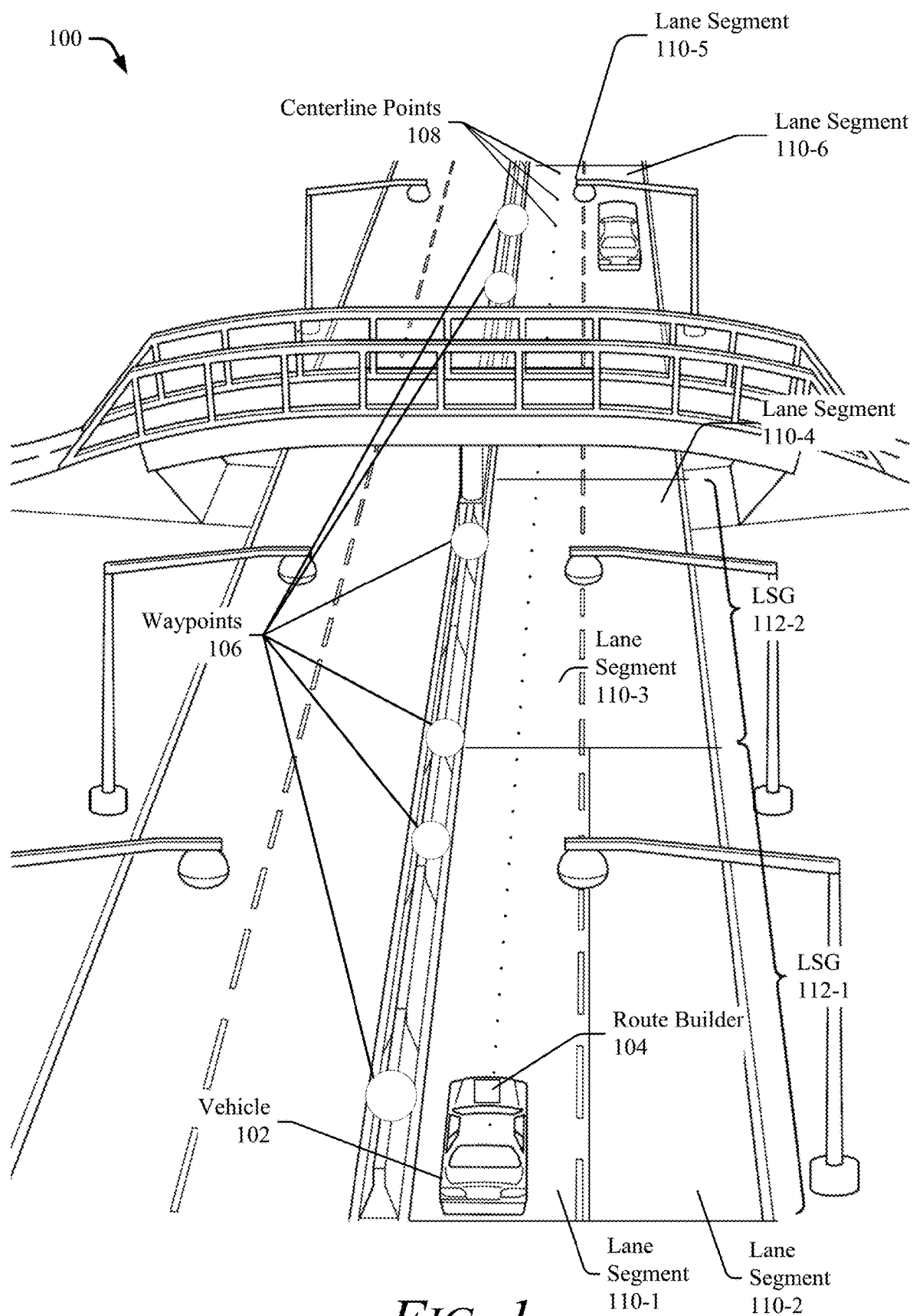
FIG. 1 illustrates an example road environment in which a route builder can perform SD to HD navigation route determination according to techniques described in this disclosure.

FIG. 1 illustrates an example road environment 100 in which a route builder 104 can perform SD to HD navigation route determination according to techniques described in this disclosure. FIG. 1 illustrates the route builder 104 as part of a system (not shown) implemented within a vehicle 102. Although presented as a car, vehicle 102 can represent other motorized vehicles (e.g., a motorcycle, a bus, a tractor, a semi-trailer truck, or construction equipment). In general, manufacturers can mount or install the route builder 104 in any moving platform traveling on the roadway.

Vehicle 102 is traveling along a navigation route on a roadway. Although presented as a road (e.g., a highway) with lanes and lane markers in FIG. 1, the roadway can be any type of designated travel routes for a vehicle, including for example virtual water lanes used by ships and ferries, virtual air lanes used by unmanned aerial vehicles (UAVs) and other aircraft, train tracks, tunnels, or virtual underwater lanes. The navigation route includes a list of multiple low-precision waypoints 106. The waypoints 106 can include respective geographic locations (e.g., latitude and longitude coordinates) provided in sequence according to the desired direction of vehicle travel on sections of the roadway. Each waypoint 106 can include a latitude and longitude coordinate that, for example, can typically have a six-meter accuracy.

The roadway includes one or more lanes, with the lanes represented by centerline points 108, lane segments 110, and lane segment groups (LSGs) 112 by the route builder 104. The lane segments 110 represent respective portions of a roadway lane. For example, the lane segments 110-1, 110-3, and 110-5 represent respective portions of the current road in which vehicle 102 is traveling. One or more lane segments 110 with the same travel direction are included in an LSG 112. The LSGs 112 are generally respective portions of a group of lanes in the same travel direction that do not split with unchanging lane markers. For example, the LSG 112-1 includes the lane segments 110-1 and 110-2. The LSG 112-2 includes the lane segments 110-3 and 110-4. The LSG 112-3 includes the lane segments 110-5 and 110-6. Each of the LSGs 112 may include a plurality of lines (e.g., vectors of points, lane markers). In some implementations, each of the LSGs 112 may include a predetermined origin. The origins can be centered laterally in the respective LSGs 112 and at the beginning of each LSG 112. The locations of the origins relative to the respective LSGs 112 may vary without departing from the scope of this disclosure.

Each of the lane segments 110 includes an array of centerline points 108 that represent the lateral center of the respective lane segment 110. The centerline points 108 are organized or associated with a lane segment 110.

In the depicted environment 100, one or more sensors (not illustrated) are mounted to or integrated within the vehicle 102. The route builder 104 uses an SD map database to generate a navigation route to a desired destination. The navigation route includes multiple waypoints 106. The route builder 104 matches the waypoints 106 provided by the SD-map database to lane geometry data from an HD map database to generate an HD navigation route. The HD map database can include the centerline points 108, the lane segments 110, and the LSGs 112 for relevant portions of the roadway along the navigation route. Details of the HD navigation route generation are discussed further below.

Example Architecture

Figure 2:
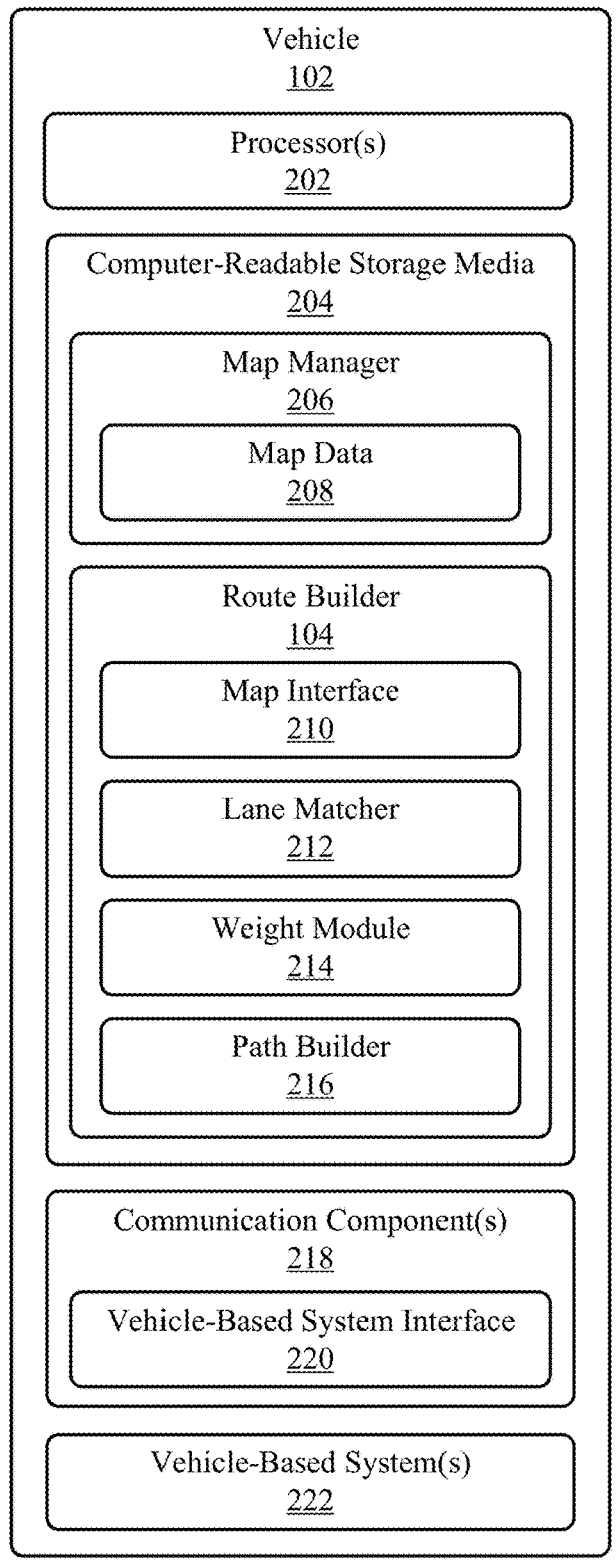
FIG. 2 illustrates the vehicle software components utilized to perform SD to HD navigation route determination according to techniques described in this disclosure.

FIG. 2 illustrates an example system with the route builder 104 that can perform SD to HD navigation route determination according to techniques described in this disclosure. Vehicle 102 includes one or more processors 202, computer-readable storage medium (CRM) 204, one or more communication components 218, and one or more vehicle-based systems 222. The vehicle 102 can also include one or more sensors (e.g., a camera, a radar system, a global positioning system (GPS), a global navigation satellite system (GNSS), a lidar system, an inertial measurement unit (IMU)) to provide input data to the one or more vehicle-based systems 222.

The processor 202 can include, as non-limiting examples, a system on chip (SoC), an application processor (AP), an electronic control unit (ECU), a central processing unit (CPU), or a graphics processing unit (GPU). The processor 202 may be a single-core processor or a multiple-core processor implemented with a homogenous or heterogenous core structure. The processor 202 may include a hardware-based processor implemented as hardware-based logic, circuitry, processing cores, or the like. In some aspects, functionalities of the processor 202 and other components of the route builder 104 are provided via integrated processing, communication, or control systems (e.g., an SoC), which may enable various operations of the vehicle 102 in which the system is embodied.

The CRM 204 described herein excludes propagating signals. The CRM 204 may include any suitable memory or storage device such as random-access memory (RAM), static RAM (SRAM), dynamic RAM (DRAM), non-volatile RAM (NVRAM), read-only memory (ROM), or Flash memory useable to store device data (not illustrated) and the map data of a map manager 206.

The processor 202 executes computer-executable instructions stored within the CRM 204 to perform the techniques described herein. For example, the processor 202 can execute the map manager 206 to process and access map data 208 or cause the route builder 104 to perform SD to HD navigation route determination.

The map manager 206 includes the map data 208. The map manager 206 can store the map data 208, process updated map data received from a remote source, and retrieve portions of the map data 208 for the route builder 104. The map data 208 can include information to generate SD navigation routes, including the waypoints 106, for the vehicle 102. The map data 208 can also include HD map data received from a remote source or a database that provides lane geometry data for sections of the roadways along an SD navigation route. The lane geometry data can include the centerline points 108, the lane segments 110, the LSGs 112, and other details associated with roadways (e.g., curvature, traffic control devices, stop bars, localization data, and three-dimensional data). The route builder 104 can associate road attributes to LSGs 112 or lane segments 110. For example, the route builder 104 can associate speed limits to lane segments 110, road curvature to lane segments 110 or centerline points 108, and stop signs to LSGs 112. In the depicted system, the map manager 206 is illustrated as located on or within the vehicle 102. In other implementations, the map manager 206 or another implementation of the map manager 206 can be located remote from vehicle 102 (e.g., in the cloud or on a remote computer system) and provide the map data 208 or a subset of the map data 208 to the vehicle 102 and the route builder 104.

Similarly, the processor 202 can execute the route builder 104 to perform SD to HD navigation route determination based on the map data 208. The route builder 104 can include a map interface 210, a lane matcher 212, a weight module 214, and a path builder 216. The map interface 210 can access the HD map database within the map data 208 to obtain the centerline points 108, lane segments 110, LSGs 112, and other landmark data for the different components of the route builder 104. The lane matcher 212 can use map data 208 to match the waypoints 106 from the SD navigation route to lane geometry data in the HD map database. The weight module 214 determines possible lanes the vehicle 102 can use to follow the SD navigation route. The weight module 214 can, for example, determine an HD navigation route that addresses lane and roadway splits and merges along the SD navigation route. The path builder 216 can define a list of continuous lane segments 110 for vehicle 102 to travel along the HD navigation route.

The communication components 218 can include a vehicle-based system interface 220. The vehicle-based system interface 220 can transmit data over a communication network of the vehicle 102 between various components of the vehicle 102 or between components of the vehicle 102 and external components. For example, when the map manager 206 and the route builder 104 are integrated within the vehicle 102, the vehicle-based system interface 220 may facilitate data transfer therebetween. When the map manager 206 is remote to the vehicle 102, the vehicle-based system interface 220 may facilitate data transfer between the vehicle 102 and a remote entity that has the map manager 206. The communication components 218 can also include a sensor interface (not illustrated) to relay measurement data from sensors as input to the vehicle-based systems 222 or other components of the vehicle 102.

The vehicle-based system interface 220 can transmit HD navigation route data to the vehicle-based systems 222 or another component of the vehicle 102. In general, the HD navigation route data provided by the vehicle-based system interface 220 is in a format usable by the vehicle-based systems 222. In some implementations, the vehicle-based system interface 220 can send information to the route builder 104, including, as a non-limiting example, the speed or heading of the vehicle 102. The route builder 104 can use this information to configure itself appropriately. For example, the route builder 104 can adjust a starting point of an HD navigation route based on the speed of the vehicle 102.

The vehicle-based systems 222 can use data from the route builder 104 to operate the vehicle 102 on the roadway. The vehicle-based systems 222 can include an assisted-driving system and an autonomous-driving system (e.g., an Automatic Cruise Control (ACC) system, Traffic-Jam Assist (TJA) system, Lane-Centering Assist (LCA) system, L3/L4 Autonomous Driving on Highways (L3/L4) system). Generally, the vehicle-based systems 222 use the HD navigation route data provided by the route builder 104 to perform a function. For example, the assisted-driving system can provide automatic cruise control and monitor for an object (as detected by another system on the vehicle 102) in the lane in which the vehicle 102 is traveling. The route data from the route builder 104 may identify the lane segments 110.

The vehicle-based systems 222 may move the vehicle 102 to a particular location on the roadway while navigating the vehicle 102 along the navigation route. The autonomous-driving system can also move vehicle 102 to a specific location on the roadway to avoid collisions with objects detected by other systems (e.g., a radar system, a lidar system) on the vehicle 102 and move the vehicle 102 back to the original navigation route. The HD navigation route data provided by the route builder 104 can provide information about the locations of the lanes and uncertainties in the locations of the lanes to enable the autonomous-driving system to perform a lane change or steer the vehicle 102.

Route Generation

Figure 3:
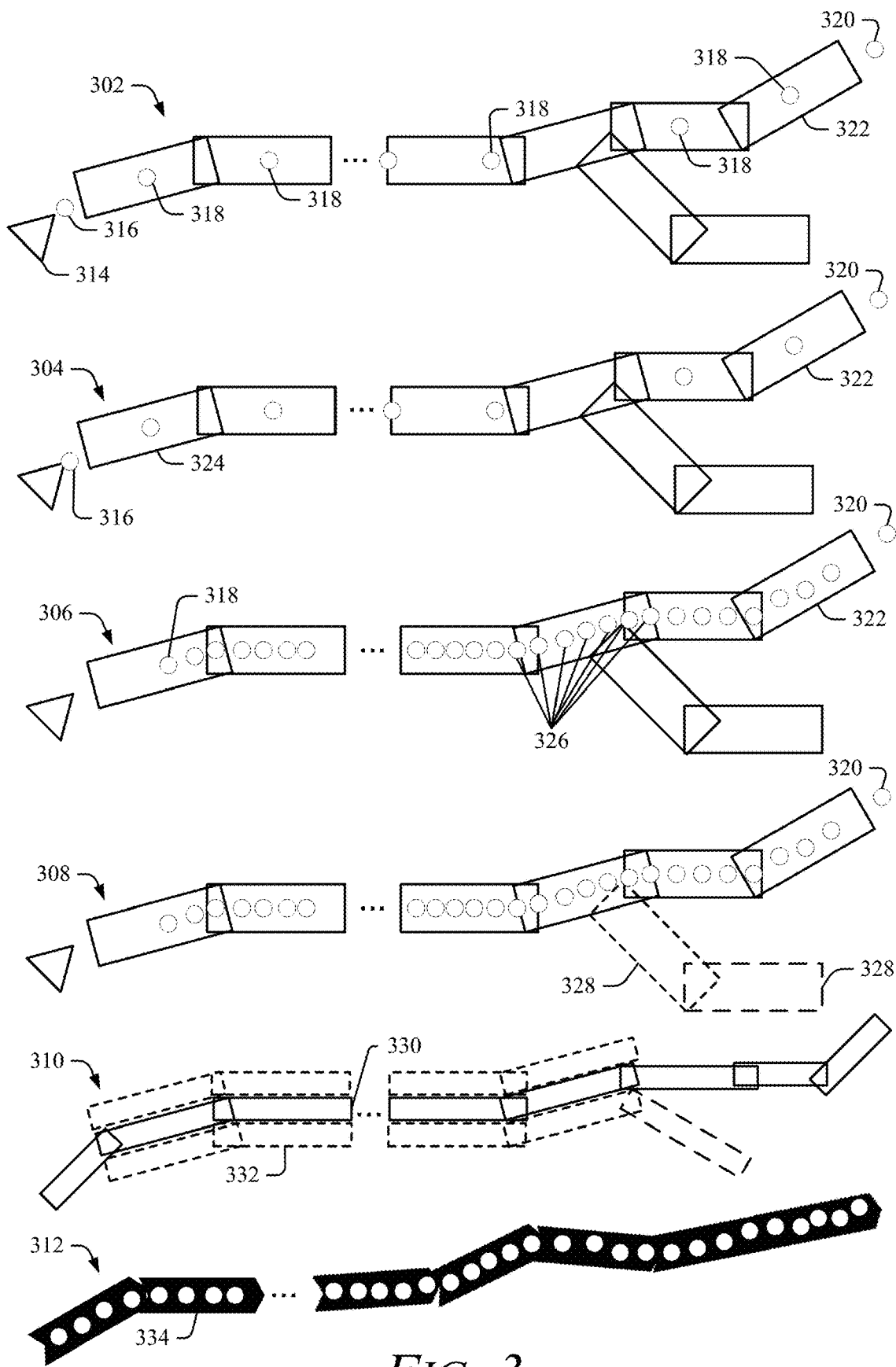
FIG. 3 illustrates example conceptual diagrams indicating how a route builder can perform an SD to HD navigation route determination according to techniques described in this disclosure.

FIG. 3 illustrates example conceptual diagrams 302 through 312 illustrating an SD to HD navigation route determination according to techniques described in this disclosure. The route builder 104 obtains an SD navigation route from a navigation system or mobile device. The SD navigation route includes a heading (e.g., direction) and a list of waypoints. The list of waypoints includes a start waypoint 316, intermediate waypoints 318, and a finish waypoint 320.

In conceptual diagram 302, the route builder 104 or the lane matcher 212 can identify an anchor point from an HD map database to finish the navigation route and a heading 314. Starting with the finish waypoint 320, the lane matcher 212 can iterate backward through the list of waypoints until a lane segment in the HD map database is identified that contains the waypoint coordinates. The lane segment can then be identified as a finish road segment 322. The finish road segment 322 does not necessarily include the finish waypoint 320 (e.g., if the destination is a building or parking area adjacent to a roadway).

In conceptual diagram 304, the route builder 104 or the lane matcher 212 can identify an anchor point from an HD map database to start the navigation route. Beginning with the start waypoint 316, the lane matcher 212 can iterate forward through the list of waypoints until a lane segment in the HD map database is identified that contains the waypoint coordinates. The lane segment can then be identified as a start road segment 324. The start road segment 324 does not necessarily include the start waypoint 316 (e.g., if the starting place is a building or parking area adjacent to a roadway).

In conceptual diagram 306, the route builder 104 or the lane matcher 212 can expand the list of waypoints via interpolation. The list of waypoints in the SD navigation route is often sparsely spaced along the route, resulting in some lane segments 110 (e.g., short lane segments) not being included in the SD navigation route. The lane matcher 212 can interpolate the list of waypoints to add waypoints 326 for missed lane segments 110 and provide a means to create a weighting metric based on the number of waypoints contained within a lane segment 110. The lane matcher 212 can apply a linear or cubic interpolation method across the coordinates for the list of waypoints to generate a HD navigation route with a dense set of waypoints. Generally, the lane matcher 212 configures the minimum spacing among the waypoints to be no greater than half the length of the shortest candidate lane segment in the route to ensure a lane segment is not skipped.

In the conceptual diagrams 308 and 310, the route builder 104 or the weight module 214 can assign weight values to lane segments 110. The weight module 214 can create a histogram with a slot for each LSG 112 and lane segment 110 within a particular LSG 112. The weight module 214 iterates through each waypoint and accumulates the number of waypoints that are geometrically contained within each LSG 112 and lane segment 110. In the conceptual diagram 308, LSGs 328 do not have any waypoints and thus will not be included in the HD navigation route generated by the route builder 104. In the conceptual diagram 310, lane segments 330 include waypoints and will be included in the HD navigation route. In contrast, lane segments 332 do not have any waypoints and will not be included in the HD navigation route. The weighting process allows the route builder 104 to determine a lane segment 110 for each portion of the HD navigation route. For example, the SD navigation route can lack information or waypoints regarding merging an on-ramp and interstate or off-ramps exiting an interstate.

In conceptual diagram 310, the route builder 104 or the path builder 216 creates the HD navigation route 334. The path builder 216 creates a sequence of connected lane segments 330 to complete navigation from the start waypoint 316 to the finish waypoint 320. The HD navigation route 334 includes handling interstate or highway on-ramps and off-ramps along with connector roads. The path builder 216 traverses the road network from the finish waypoint 320 backward to the start waypoint 316. The path builder 216 may use candidate matching logic to determine the correct path for mergers in the road lane segments.

Figure 4:
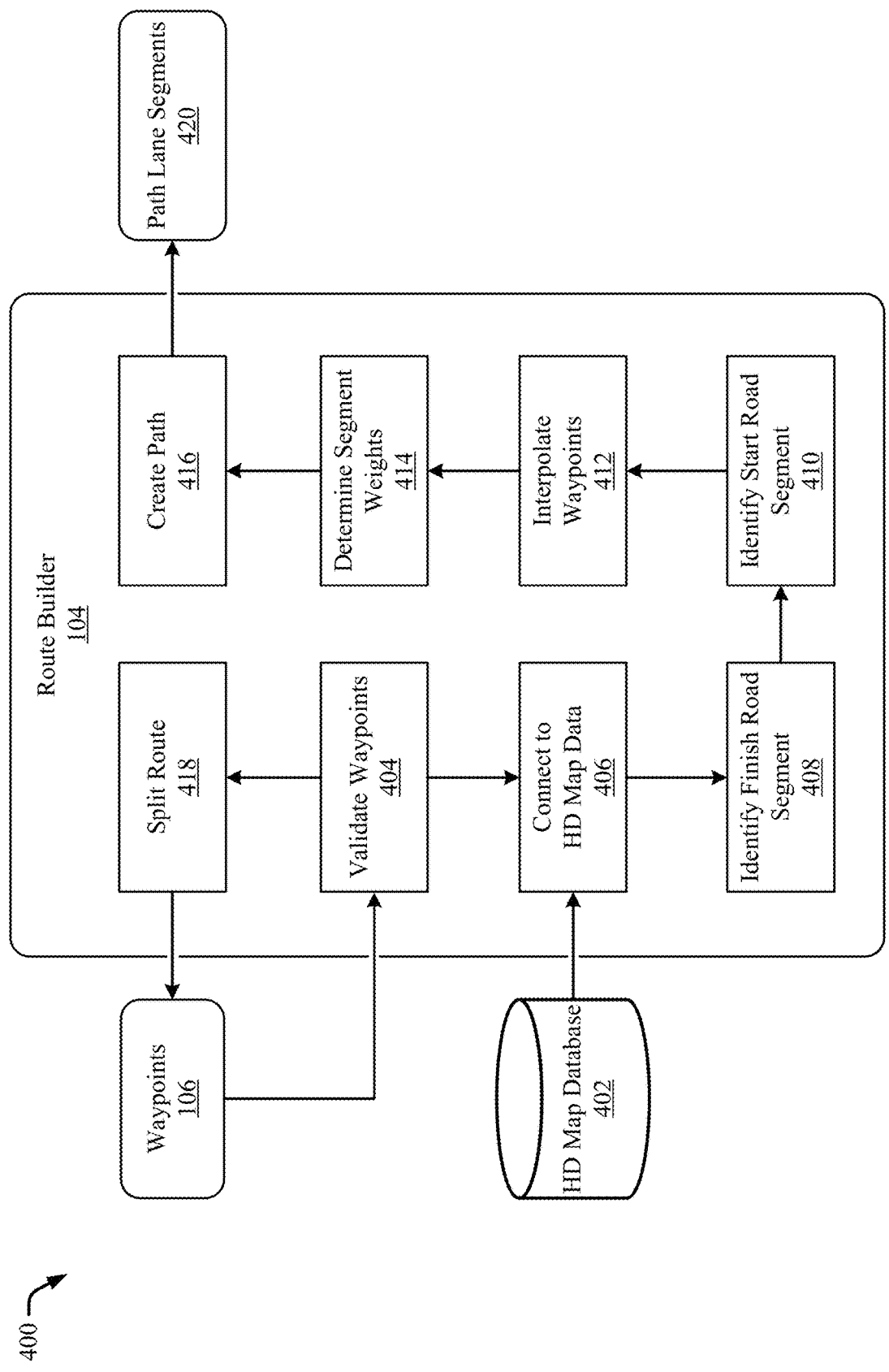
FIG. 4 illustrates an example conceptual diagram of a software method to perform SD to HD navigation route determination according to techniques described in this disclosure.

FIG. 4 illustrates an example conceptual diagram 400 of a software method to perform SD to HD navigation route determination according to techniques described in this disclosure. The route builder 104 of FIGS. 1 and 2 or another component can perform the software method illustrated in the conceptual diagram 400.

Inputs to the route builder 104 include the waypoints 106 and data originating from an HD map database 402. The waypoints 106 include a list of waypoints for the navigation route provided by an SD navigation system. The waypoints 106 include multiple geographic locations (e.g., latitude and longitude coordinates) provided in sequence according to the desired direction of travel to reach the desired destination. As described above, the waypoints 106 generally have an accuracy of approximately plus or minus three meters.

The HD map database 402 includes the relevant road network data for the navigation route. The HD map database 402 includes lane geometry data and the associated lane connectivity information. The lane geometry data generally has an accuracy of ten centimeters. The HD map database 402 can include road network data for a particular region (e.g., North America, Europe, Asia), country, state, county, or city.

At 404, the route builder 104 validates the waypoints 106. The validation includes a basic check on the waypoint coordinates along with a bounds check to ensure the navigation route overlays the contents of the HD map database 402 (e.g., a navigation route along Chinese roads may not match to HD map database 402 for European roads). The route builder 104 can also analyze the navigation route to determine if the waypoints 106 exit and reenter the HD road network (e.g., the navigation route includes exiting a highway to stop for refueling or recharging in an urban area not covered by the HD map database 402 and then reentering the highway). If so, the route builder 104 may split the HD navigation route into multiple paths.

At 418, the route builder 104 calls a splitting operation when the navigation route includes gaps not covered by the road network within the HD map database 402. In such scenarios, the navigation route can be partitioned into multiple sub-routes that include continuous paths on the road network. The multiple sub-routes are submitted as inputs to operations 404 through 416.

At 406, the route builder 104 queries the HD map database 402 to obtain lane geometry data for the route determination.

At 408, the route builder 104 identifies the last or finish road segment 322 containing one of the waypoints 106. The finish road segment 322 is determined from the lane geometry data in the HD map database 402. The waypoints 106 can continue off or outside the HD map database 402, so the route builder 104 can limit the HD navigation route to where the lane geometry data in the HD map database 402 ends.

At 410, the route builder 104 identifies the first or start road segment 324 containing one of the waypoints 106. The start road segment 324 is determined from the lane geometry data in the HD map database 402. The waypoints 106 can begin off or outside the HD map database 402, so the route builder 104 can limit the HD navigation route to where the lane geometry data in the HD map database 402 starts.

At 412, the route builder 104 interpolates the waypoints 106 to add additional waypoints to the navigation route at a configurable spacing (e.g., every 30 cm). The configurable spacing may be static (e.g., fixed) or dynamic (e.g., based on the shortest lane segment 110 or LSG 112 along the navigation route). The additional waypoints improve the weighting performed by the route builder 104 and close gaps for lane segments 110 or LSGs 112 missed by the waypoints 106.

The route builder 104 can also maintain a list or array of lane node objects that have been matched to the waypoints in the navigation route. The lane nodes include connectivity data to link previous and next lane nodes together to form the road network.

At 414, the route builder 104 determines a weight for each potential lane segment 110 and LSG 112 along the navigation route. The route builder 104 can store an accumulation of waypoints within each lane segment 110 and LSG 112 (e.g., within a histogram, array, or variable set).

At 416, the route builder 104 creates a path for the navigation route. The path is based on the weights for the potential lane segments 110 and LSGs 112 by crawling the navigation route in reverse. The created path includes path lane segments 420 within the HD map database 402 to travel from the starting point to the finish point. The path lane segments 420 can be defined or identified using a list or array of lane segment identifications to define the navigation route at a lane level. Similarly, the path lane segments 420 can include a list or array of LSG identifications to define the navigation route at a road section level.

Figure 5:
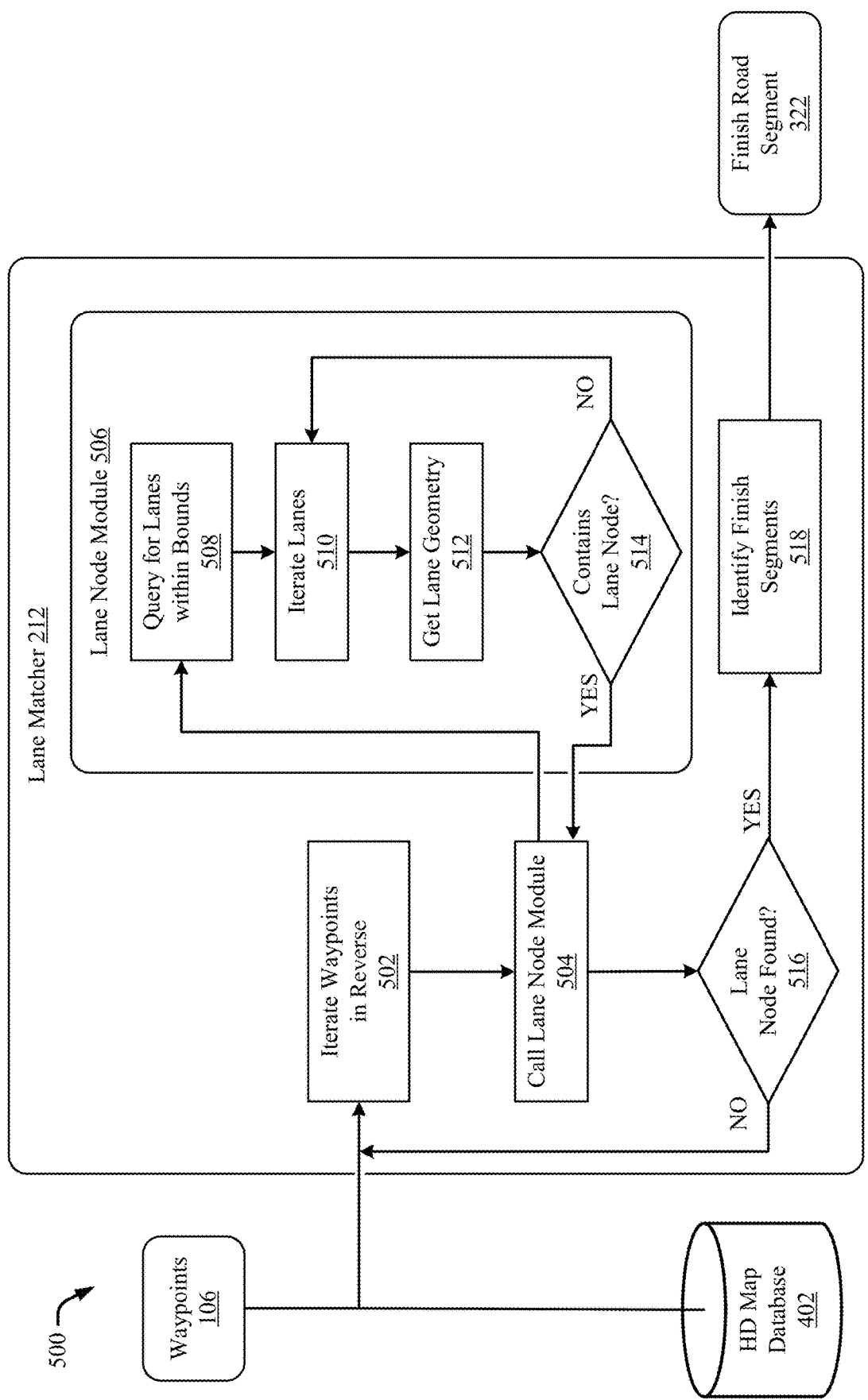
FIG. 5 illustrates an example conceptual diagram of a software method to identify a finish lane segment and LSG for a navigation route.

FIG. 5 illustrates an example conceptual diagram 500 of a software method to identify a finish road segment 322 for a navigation route. The conceptual diagram 500 provides a more detailed description of operation 408 (e.g., identifying the finish segments) of FIG. 4. The route builder 104 of FIGS. 1 and 2 or the lane matcher 212 of FIG. 2 can perform the software method illustrated in the conceptual diagram 500.

Inputs to the lane matcher 212 include the waypoints 106 and the HD map database 402. As described above, the waypoints 106 include a list of waypoints for the navigation route and are provided by the SD navigation system. The HD map database 402 includes the relevant road network data for the navigation route. The HD map database 402 includes lane geometry data and the associated lane connectivity information.

At 502, the lane matcher 212 iterates through the waypoints 106 in reverse until a waypoint is identified within an HD map lane node (e.g., lane segment 110, LSG 112, or a combination thereof).

At 504, the lane matcher 212 calls or initiates a lane node module 506 for each waypoint 106 to determine if the respective waypoint coordinates are contained within a lane node of the HD map database 402.

At 508, the lane node module 506 queries the HD map database 402 for the lane nodes that contain the waypoint coordinates. The lane node module 506 can expand the waypoint coordinates by a configurable amount (e.g., ten meters) to find a lane node even when the waypoint is not included within the road network of the HD map database 402. The expanded coordinates may help identify the finish lane segment and LSG 522 when the waypoint coordinates are inaccurate.

At 510, the lane node module 506 iterates through the queried lane nodes to determine a match.

At 512, the lane node module 506 obtains the lane geometry to create a polygon for the lane area. The polygon is used to determine if the waypoint position is contained within the lane node.

At 514, the lane node module 506 determines whether the waypoint is contained within the lane area to identify the matching lane segment 110. If a matching lane node is found, a reference or identification for the lane node is returned to the lane matcher 212. If a matching lane node is not found, the lane node module 506 returns to operation 510.

If no lane nodes are matched by the lane node module 506, the waypoint is likely off the road. The lane node module 506 checks the waypoint to determine if it is located to the right of the rightmost lane or the left of the leftmost lane. The lane node module 506 can return the appropriate lane to the lane matcher 212.

At 516, the lane matcher 212 determines whether the lane node for the waypoint has been found. At 518, if the lane node has been found, the lane matcher 212 identifies the finish road segment 322. The finish road segment 322 can be identified by identification values based on the matching lane node. If the lane node has not been found, the lane matcher 212 returns to operation 502 to iterate through the waypoints 106.

Figure 6:
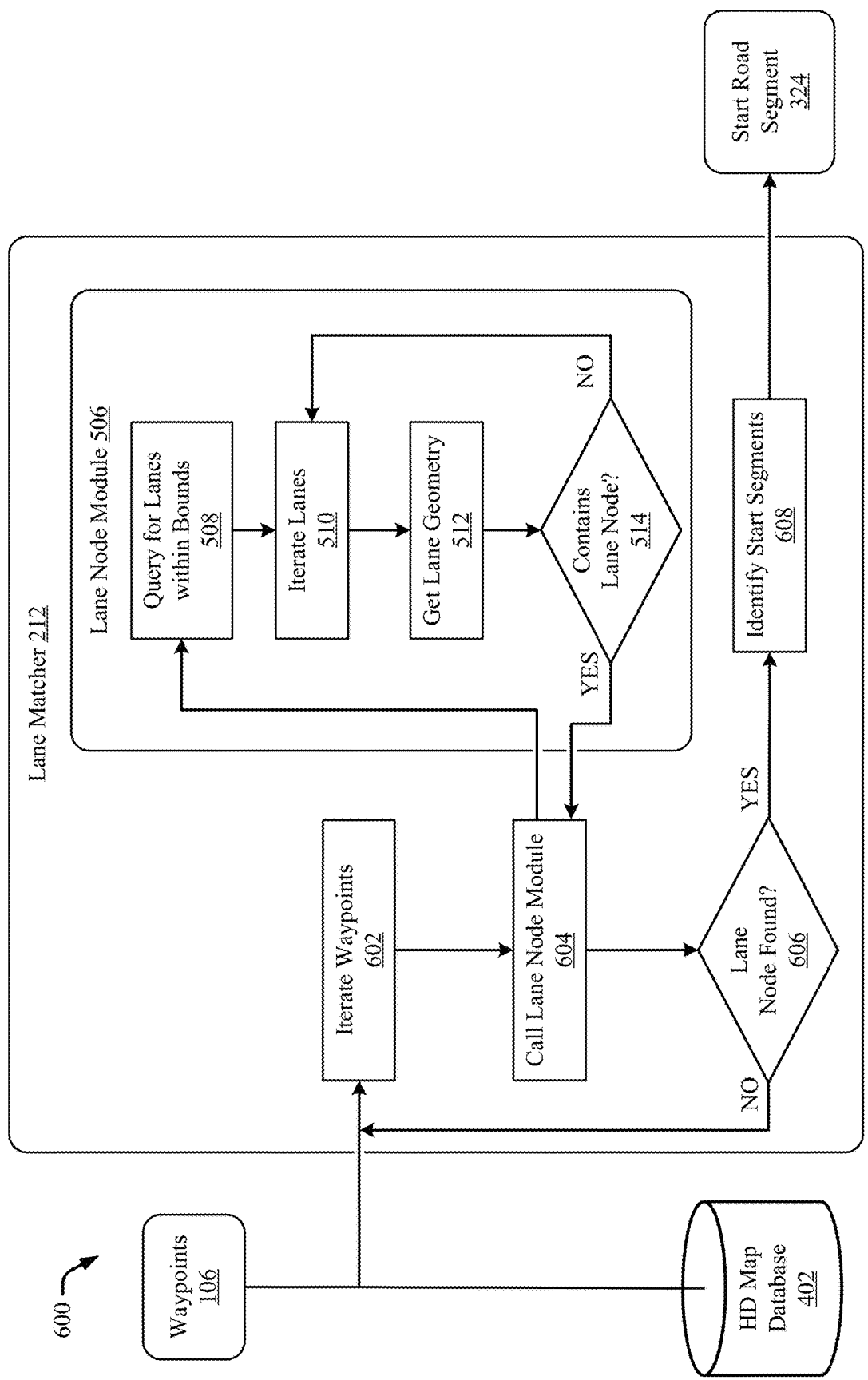
FIG. 6 illustrates an example conceptual diagram of a software method to identify a start lane segment and LSG for a navigation route.

FIG. 6 illustrates an example conceptual diagram 600 of a software method to identify a start road segment 324 for a navigation route. The conceptual diagram 600 provides a more detailed description of operation 410 (e.g., identifying the start segments) of FIG. 4. The route builder 104 of FIGS. 1 and 2 or the lane matcher 212 of FIG. 2 can perform the software method illustrated in the conceptual diagram 600.

Inputs to the lane matcher 212 include the waypoints 106 and the HD map database 402. As described above, the waypoints 106 include a list of waypoints for the navigation route and are provided by the SD navigation system. The HD map database 402 includes the relevant road network data for the navigation route. The HD map database 402 includes the lane geometry data and the associated lane connectivity information.

At 602, the lane matcher 212 iterates through the waypoints 106 until a waypoint is identified within an HD map lane node (e.g., lane segment 110, LSG 112, or a combination thereof).

At 604, the lane matcher 212 calls or initiates the lane node module 506 for each waypoint 106 to determine if the respective waypoint's coordinates are contained within a lane node of the HD map database 402. The lane node module 506 performs the same or similar operations as described in reference to FIG. 5.

At 508, the lane node module 506 queries the HD map database 402 to find the lane nodes that contain the waypoint coordinates. The lane node module 506 can expand the waypoint coordinates by a configurable amount (e.g., ten meters) to find a lane node even when the waypoint is not included within the road network of the HD map database 402. The expanded coordinates help identify the start lane segment and LSG 610 when the waypoint coordinates are inaccurate.

At 510, the lane node module 506 iterates through the queried lane nodes to determine a match.

At 512, the lane node module 506 obtains the lane geometry to create a polygon for the lane area. The polygon is used to determine if the waypoint position is contained within the lane node.

At 514, the lane node module 506 determines whether the waypoint is contained within the lane area to identify the matching lane segment 110. If a matching lane node is found, a reference or identification for the lane node is returned to the lane matcher 212. If a matching lane node is not found, then the lane node module 506 returns to operation 510.

If no lane nodes are matched by the lane node module 506, the waypoint is likely off the road, and the lane node module 506 checks the waypoint to determine if it is located to the right of the rightmost lane or the left of the leftmost lane. The lane node module 506 can return the appropriate lane to the lane matcher 212.

At 606, the lane matcher 212 determines whether the lane node for the waypoint has been found. At 608, if the lane node has been found, the lane matcher 212 identifies the start road segment 324. The start road segment 324 can be identified by identification values based on the matching lane node. If the lane node has not been found, the lane matcher 212 returns to operation 602 to iterate through the waypoints.

Figure 7:
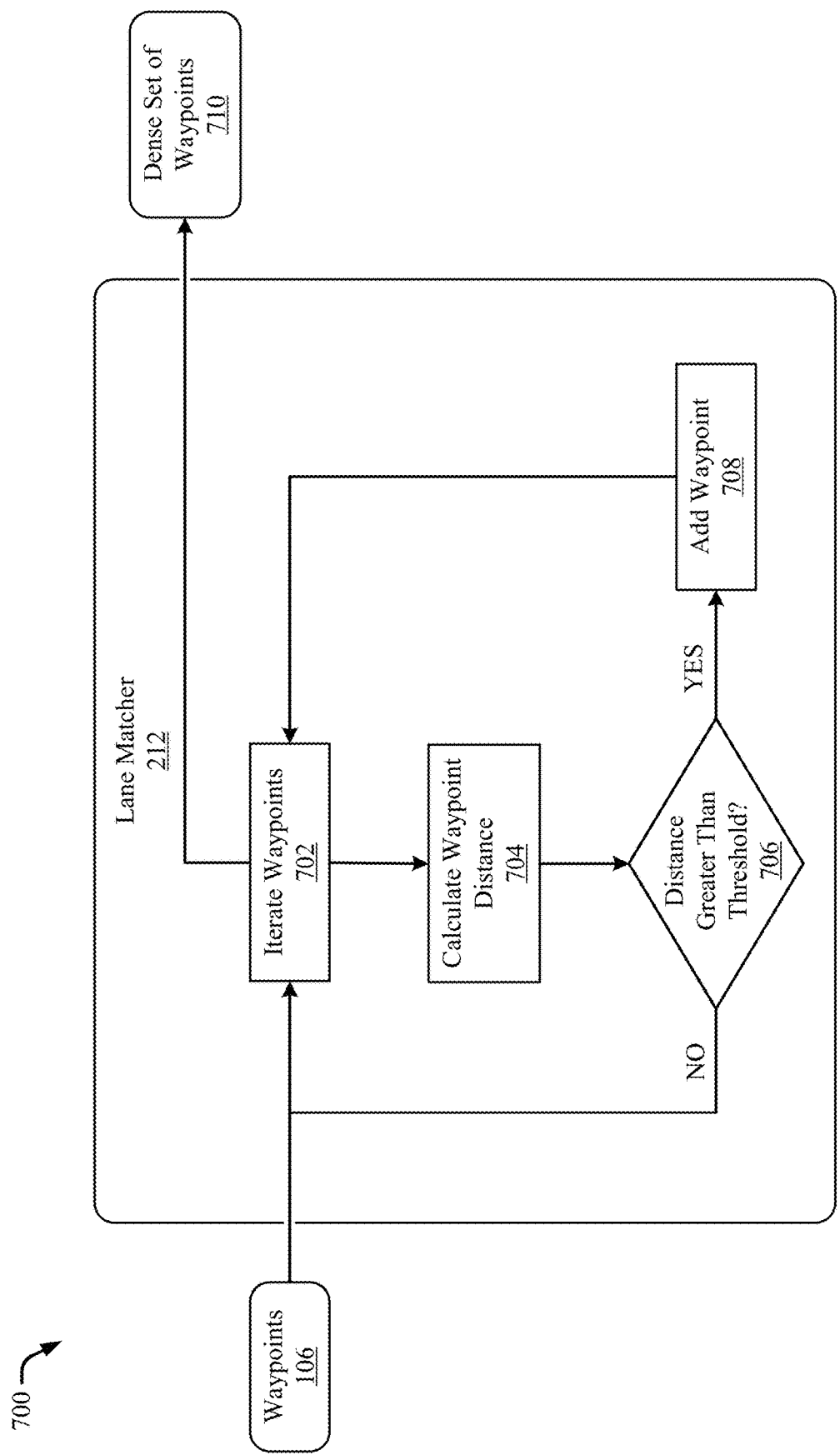
FIG. 7 illustrates an example conceptual diagram of a software method to interpolate the waypoints for a navigation route.

FIG. 7 illustrates an example conceptual diagram 700 of a software method to interpolate the waypoints 106 for a navigation route. The conceptual diagram 700 provides a more detailed description of operation 412 (e.g., interpolating the waypoints 106) of FIG. 4. The route builder 104 of FIGS. 1 and 2 or the lane matcher 212 of FIG. 2 can perform the software method illustrated in the conceptual diagram 700.

Inputs to the lane matcher 212 include the waypoints 106. As described above, the waypoints 106 include the list of waypoints for the navigation route and are provided by the SD map database. The output of the lane matcher 212 is a dense set of waypoints 710 to better match the lane segments 110 of the navigation route. The dense set of waypoints 710 can be stored as a variable that defines the navigation route.

At 702, the lane matcher 212 iterates through the waypoints 106. The iteration generates a dynamic list of waypoints and allows for the additional waypoints to the list while iterating.

At 704, lane matcher 212, for each pair of adjacent waypoints in the list, calculates a Euclidian distance between the respective waypoints. At 706, the lane matcher 212 determines whether the distance between the waypoints is greater than a distance threshold (e.g., 20 meters). The distance threshold can be adjusted to provide the desired weighting for the weight module 214. At 708, if the distance is greater than the distance threshold, the lane matcher 212 interpolates between the waypoints to determine the coordinates of an intermediate waypoint. It then adds the intermediate waypoint to the list between the waypoints. The lane matcher 212 then iterates to the intermediate waypoint at operation 702 and continues the operations of the conceptual diagram 700. If the distance is not greater than the distance threshold, then the lane matcher 212 returns to operation 702 and iterates to the next waypoint in the list. When the lane matcher 212 has iterated through the list of waypoints to the final waypoint, the lane matcher outputs the dense set of waypoints 710.

Figure 8:
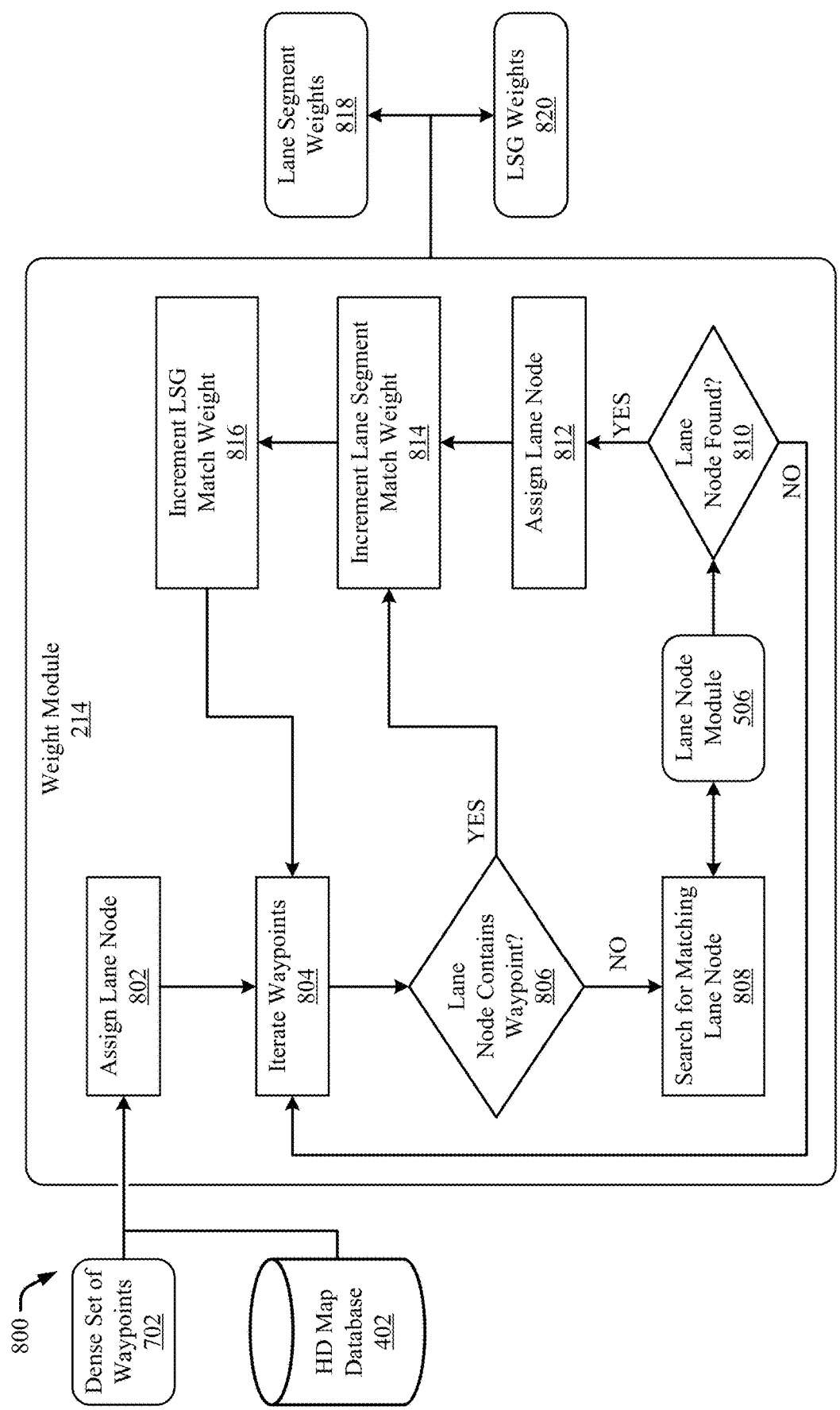
FIG. 8 illustrates an example conceptual diagram of a software method to determine segment weights for an SD to HD navigation route determination.

FIG. 8 illustrates an example conceptual diagram 800 of a software method to determine segment weights for SD to HD navigation route determination. The conceptual diagram 800 provides a more detailed description of operation 414 (e.g., determining the segment weights) of FIG. 4. The route builder 104 of FIGS. 1 and 2 or the weight module 214 of FIG. 2 can perform the software method illustrated in the conceptual diagram 800.

Inputs to the weight module 214 include the dense set of waypoints 702 and the HD map database 402. As described above, the dense set of waypoints 702 includes a list of waypoints for the navigation route output by the lane matcher 212. The HD map database 402 includes the relevant road network data for the navigation route. The HD map database 402 includes the lane geometry data and the associated lane connectivity information. Outputs from the weight module 214 include lane segment weights 818 and LSG weights 820 based on the number of waypoints.

At 802, the weight module 214 assigns a finish lane node to a lane node variable, which initializes a current lane node to account for the high probability that the last waypoint matches. At 804, the weight module 214 iterates through the dense set of waypoints 702 from the last waypoint (e.g., the end of the navigation route) to the first waypoint (e.g., the start of the navigation route). At 806, the weight module 214 determines whether the respective lane node contains the current waypoint. The weight module 214 can call a specific object (e.g., a lane node object) to make the determination. If the waypoint is contained within the lane node, then the weight module 214 continues to operation 814, as described below.

If the waypoint is not within the lane node, at 808, the weight module 214 searches for a matching lane node. The weight module 214 can call the lane node module 506 to determine if the HD map database 402 includes a lane node that contains the current waypoint. The lane node module 506 performs the same or similar operations as described in reference to FIGS. 5 and 6.

At 810, the weight module 214 determines whether a matching lane node is found. If a matching lane node is not found, then the current waypoint is discarded, and the weight module 214 returns to operation 804 to continue to the next waypoint in the dense set of waypoints 702. At 812, if a matching lane node is found, the weight module 214 assigns the lane node to a lane node variable. At 814 and 816, the weight module 214 increments the lane segment weight 818 and the LSG weight 820, respectively, for the current lane node.

Figures 1, 9:
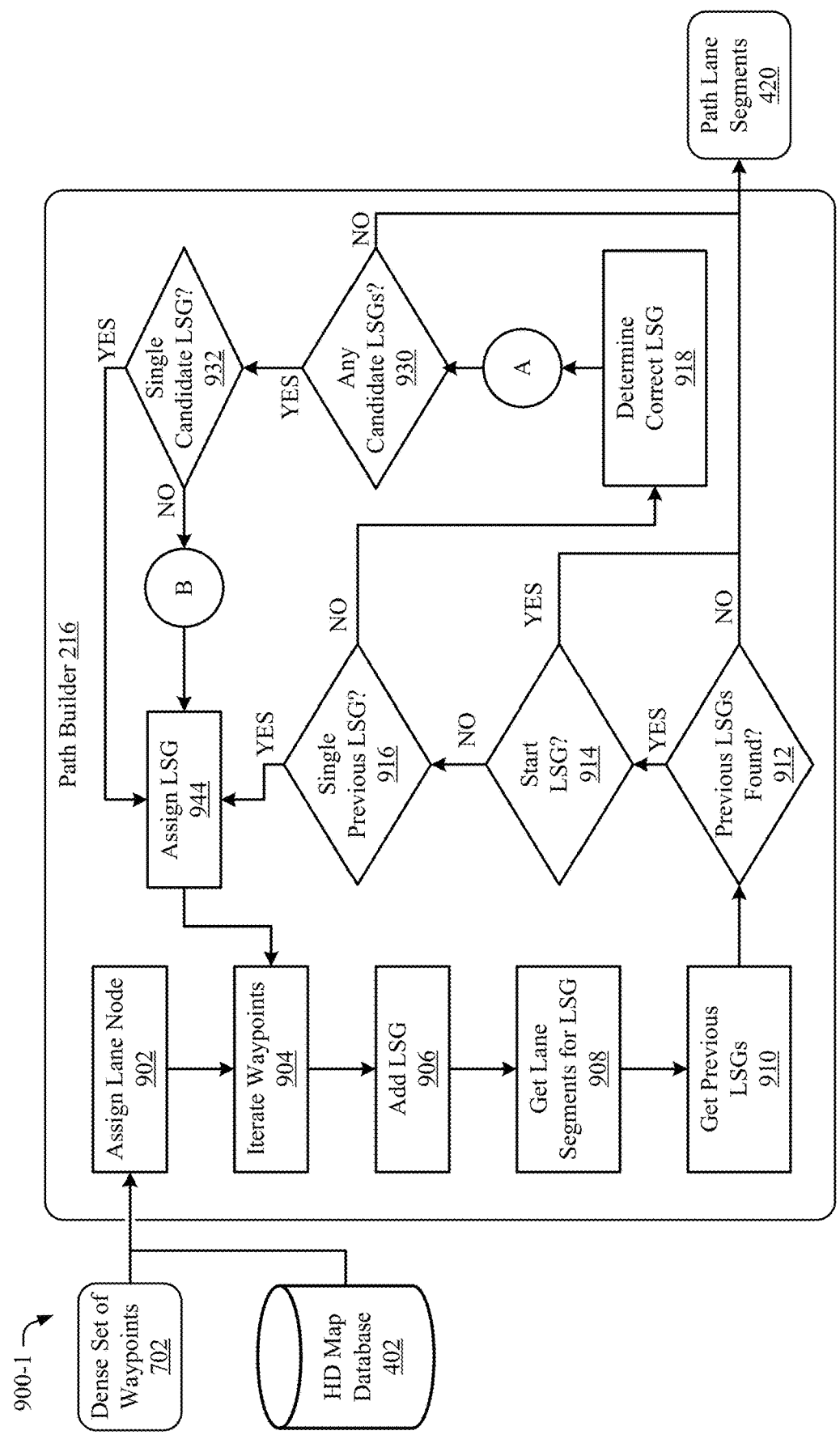
Figures 2, 9:
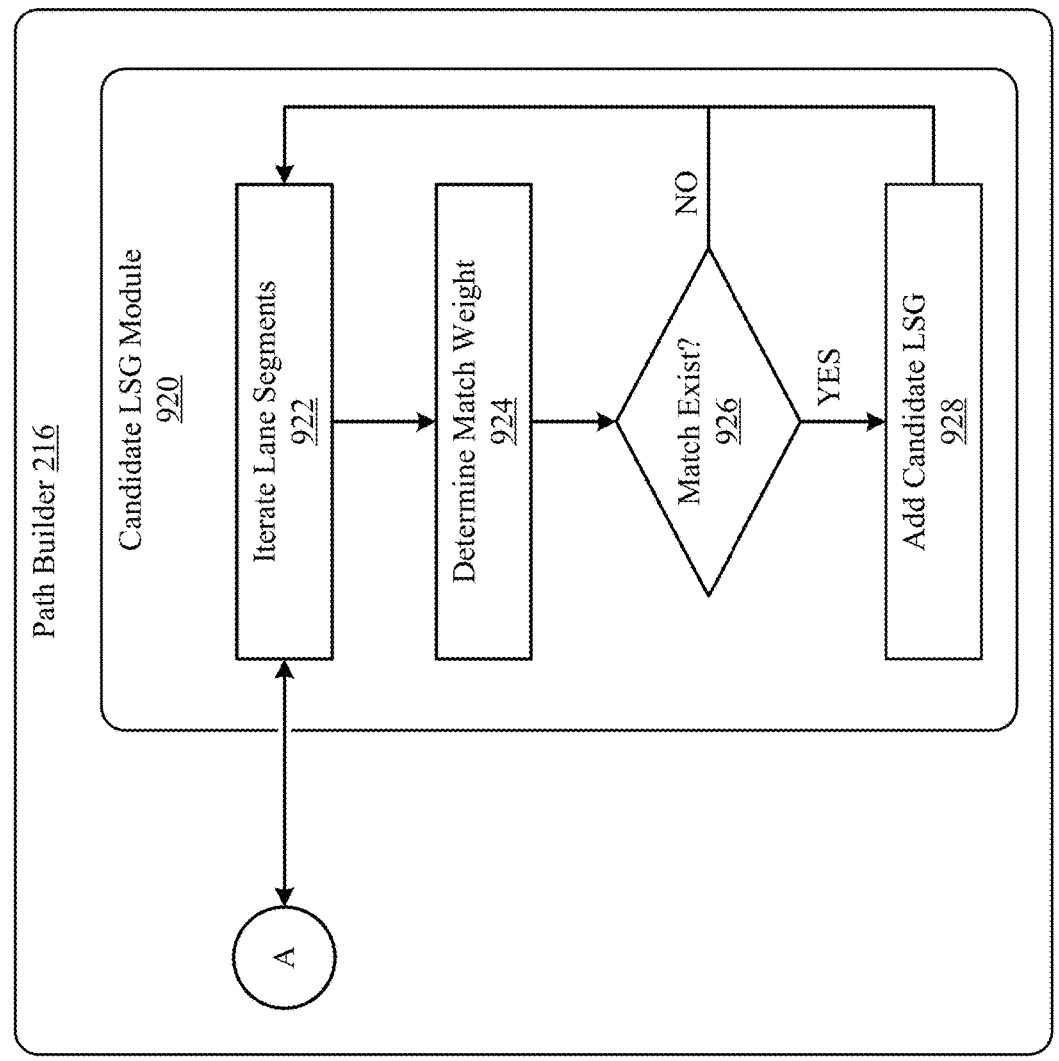
Figures 3, 9:
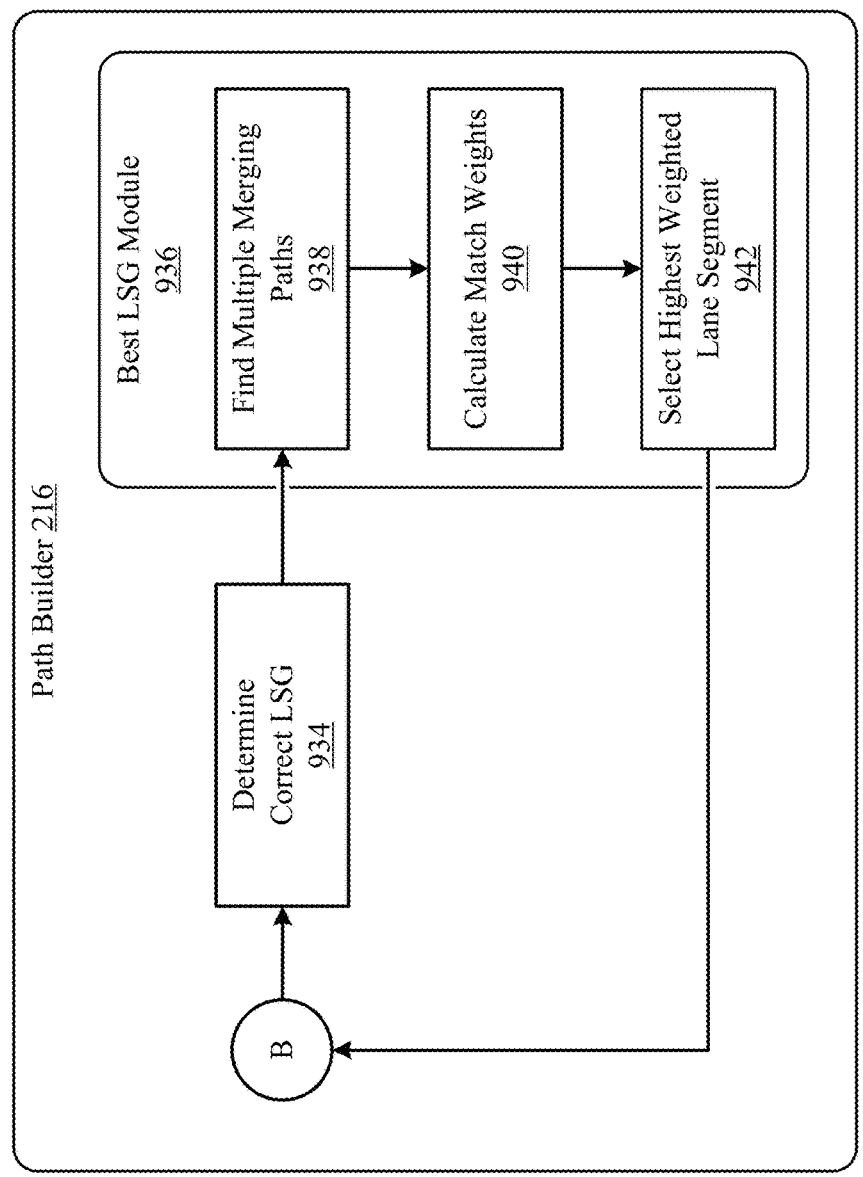

FIGS. 9-1 through 9-3 illustrate example conceptual diagrams 900-1, 900-2, and 900-3, respectively, of a software method to generate the path lane segments 420 for the HD navigation route. The conceptual diagrams 900-1 through 900-3 provide a more detailed description of operation 416 (e.g., creating the path lane segments 420) of FIG. 4. The route builder 104 of FIGS. 1 and 2 or the path builder 216 of FIG. 2 can perform the software method illustrated in the conceptual diagrams 900-1 through 900-3.

Inputs to the path builder 216 include the dense set of waypoints 702 and the HD map database 402. As described above, the dense set of waypoints 702 includes the list of waypoints for the navigation route that is output by the lane matcher 212. The HD map database 402 includes the relevant road network data for the navigation route. The HD map database 402 includes the lane geometry data and the associated lane connectivity information. Outputs from path builder 216 include the path lane segments 420 and the HD navigation route.

At 902, the path builder 216 assigns the LSG from the finish lane node to an LSG variable, which initializes the process to start from the end of the navigation route and work in reverse through lane and road mergers. At 904, the path builder 216 iterates through the dense set of waypoints 702 from finish to start to determine the matching lane segments 110.

At 906, the path builder 216 adds a currently matched LSG to the navigation route. Path builder 216 can accumulate identification information for the list of matching LSGs for the navigation route. At 908, path builder 216 obtains all the lane segments 110 for the current LSG 112 from the HD map database 402.

At 910, the path builder 216 queries the HD map database 402 to obtain the previous LSG 112 for the currently matched LSG 112. For continuous roads, a single LSG 112 is retrieved. Merger conditions result in multiple previous LSGs 112 to be evaluated by the path builder 216 to determine the correct path. At 912, the path builder 216 determines whether a previous LSG is found. If no previous LSG is found, this indicates the end of the road within the HD map database 402, and the path builder 216 terminates the software method and outputs the path lane segments 420.

At 914, if a previous LSG is found, the path builder 216 determines whether the previous LSG is a starting LSG. If the previous LSG is the starting LSG, this indicates the path is complete from the finish waypoint to the start waypoint of the HD navigation route, and the path builder 216 terminates the software method and outputs the path lane segments 420. At 916, if the previous LSG is not the starting LSG, then the path builder 216 determines whether a single previous LSG was found. If a single LSG was obtained in operation 910, then the path builder 216 proceeds to operation 944, as described in greater detail below.

At 918, if multiple LSGs were obtained as the previous LSG(s), then the path builder 216 determines the correct LSG. For example, a candidate LSG module 920 can be called to choose the correct path to continue building the HD navigation route. The candidate LSG module 920 can walk through each candidate LSG to compare the LSG weights 820 between each option. At 922, the candidate LSG module 920 iterates through each lane segment 110 for each previous LSG. At 924, the candidate LSG module 920 determines a lane segment weight 818 for each lane segment 110. At 926, the candidate LSG module 920 determines whether a match exists by identifying whether any lane segment 110 has a lane segment weight 818 greater than zero. If no match exists, the candidate LSG module 920 returns to operation 922. If a match exists, at 928, the candidate LSG module 920 adds the LSG to the output list of candidate LSGs.

At 930, the path builder 216 determines whether there are any candidate LSGs. If there are no candidate LSGs, the path builder 216 terminates the software method and outputs the path lane segments 420. If there is at least one candidate LSG, at 932, the path builder 216 determines whether there is a single candidate LSG. At 934, if multiple candidate LSGs are present, the path builder 216 determines the correct LSG. The path builder 216 can call a best LSG module 936 to determine the correct LSG. The best LSG module 936 iterates through each candidate path to compare the overall match weights between each candidate LSG. At 930, the best LSG module 936 queries the HD map database 402 to find multiple merging paths. At 940, the best LSG module 936 calculates and accumulates the match weights for each lane segment of the candidate LSGs. At 942, the best LSG module 936 selects the highest weighted lane segment. At 944, the path builder 216 assigns the current LSG variable equal to the previous or candidate LSG and returns to operation 904.

Example Method

Figure 10:
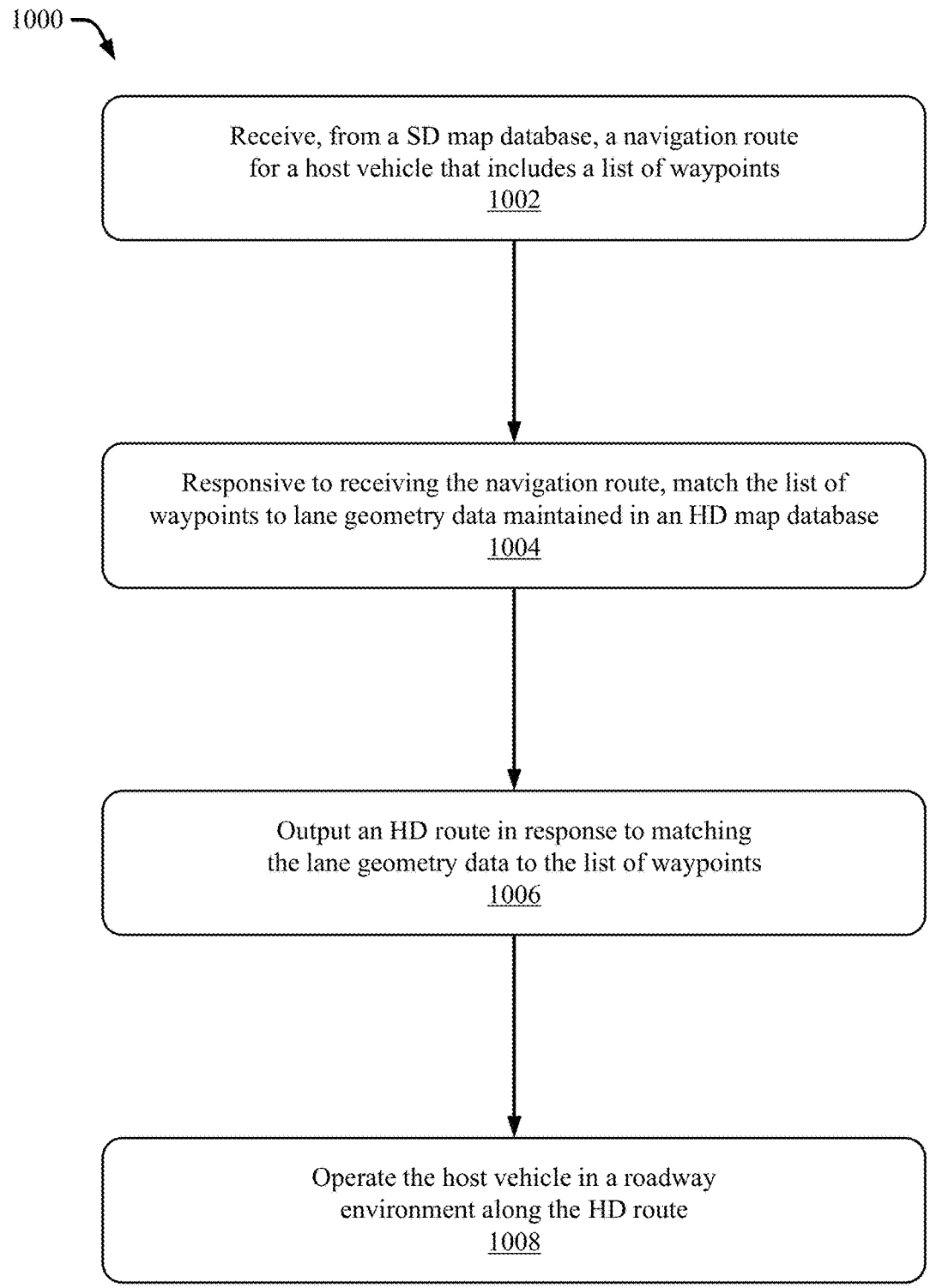
FIG. 10 illustrates an example flowchart as an example process performed by a route builder for SD to HD navigation route determination.

FIG. 10 illustrates an example flowchart 1000 as an example process performed by a route builder for SD to HD navigation route determination. Flowchart 1000 is shown as sets of operations (or acts) performed, but not necessarily limited to the order or combinations in which the operations are shown herein. Further, one or more of the operations may be repeated, combined, or reorganized to provide other methods. In portions of the following discussion, reference may be made to route builder 104 of FIGS. 1 through 9-3 and entities detailed therein, references to which are made for example only. The techniques are not limited to performance by one entity or multiple entities.

At 1002, a route builder receives a navigation route for a host vehicle from an SD map database that includes a list of waypoints. For example, the route builder 104 can receive the navigation route for vehicle 102 from the SD map database. The navigation route includes the list of waypoints 106. The SD map database can be installed in the vehicle 102 or located remote from the vehicle 102 (e.g., in the cloud, on a remote computer system, on a mobile device, other mobile computing system). If the SD map database is remote to or separate from the vehicle 102, the navigation route can be wirelessly communicated to vehicle 102 (e.g., via cellular, WiFi, Bluetooth, other wireless communication).

At 1004, responsive to receiving the navigation route, the route builder matches the list of waypoints to lane geometry data maintained in an HD map database. For example, the route builder 104 matches the list of waypoints 106 to lane geometry data in response to receiving the navigation route. The lane geometry data is maintained in the HD map database 402. The HD map database 402 can be installed in the vehicle 102 or stored remotely (e.g., in the cloud or another computer system). The HD map database 402 can include road segment data (e.g., lane segments 110, LSGs 112, associated connectivity data) for roads of a particular region (e.g., North America). For example, the HD map database 402 can be located remote from the vehicle 102 and execute the operation 1004 remote from the vehicle 102. The HD map database 402 can then send the HD navigation route, including the path lane segments 420, via wireless communication to the vehicle 102.

The route builder 104 can match the list of waypoints 106 to the lane geometry data by identifying the finish road segment and the start road segment of the HD navigation route. The route builder 104 can identify the finish road segment (e.g., the finish lane segment and LSG 522) by starting with the last waypoint in the list of waypoints 106 and iterating backward through the list of waypoints 106 to identify the finish lane segment that includes coordinates of a waypoint in the list of waypoints 106. The route builder 104 can identify the start road segment (e.g., the start lane segment and LSG 610) by starting with the first waypoint in the list of waypoints 106 and iterating forwards through the list of waypoints 106 to identify the start lane segment that includes coordinates of a waypoint in the list of waypoints 106.

The route builder 104 can then interpolate the list of waypoints 106 between the start road segment and the finish road segment to generate the dense set of waypoints 710. The dense set of waypoints 710 includes the list of waypoints 106 and the additional waypoints. The interpolation of the list of waypoints 106 can be performed by applying linear interpolation or cubic interpolation across coordinates of the list of waypoints to generate the dense set of waypoints 710. The spacing between waypoints in the dense set of waypoints 710 is generally configurable and can be less than half the length of the shortest candidate road segment among the candidate road segments.

The route builder 104 can weight the candidate road segments between the start and finish road segments. The candidate road segments include lane segments 110 and LSGs 112. The route builder 104 performs the weighting by iterating through each waypoint in the dense set of waypoints 710 and accumulating a number of waypoints geometrically contained within each lane segment and each LSG in the candidate road segments.

The route builder 104 can create the HD navigation route that includes the path lane segments 420 between the start and finish road segments. The path lane segments 420 can be determined in reverse order. The route builder 104 applies candidate matching logic to determine the lane segments 110 from the finish road segment to the start road segment, including determining the correct road segments at mergers in the candidate road segments. The path lane segments 420 can also be determined in a forward manner in other implementations. For example, the route builder 104 can apply candidate matching logic to determine the lane segments 110 from the start road segment to the finish road segment, including determining the correct road segments at mergers in the candidate road segments. The HD navigation route includes a sequential list of the path lane segments 420 from the starting point to the finish point of the navigation route.

At 1006, the route builder outputs the HD navigation route in response to matching the lane geometry data to the list of waypoints. The HD navigation route is output to a vehicle controller of the host vehicle. For example, route builder 104 outputs an HD navigation route to a vehicle controller, including vehicle-based systems 222. The HD navigation route includes the list of waypoints 106, additional waypoints, and the lane geometry data. The HD navigation route can also have the path lane segments 420.

At 1008, the vehicle controller operates the host vehicle in a roadway environment along the HD navigation route. For example, the vehicle-based systems 222 can operate vehicle 102 on roads to navigate the HD navigation route.

EXAMPLES

In the following section, examples are provided.

Example 1: A method comprising: receiving, from a standard-definition (SD) map database, a navigation route for a host vehicle, the navigation route including a list of waypoints; responsive to receiving the navigation route, matching the list of waypoints to lane geometry data maintained in a high-definition (HD) map database; outputting, to a vehicle controller, an HD navigation route in response to matching the lane geometry data to the list of waypoints, the HD navigation route including the list of waypoints, additional waypoints, and the lane geometry data; and operating, with the vehicle controller, the host vehicle in a roadway environment along the HD navigation route.

Example 2: The method of example 1, wherein matching the list of waypoints to the lane geometry data comprises: identifying a finish road segment of the HD navigation route; identifying a start road segment of the HD navigation route; interpolating the list of waypoints between the start road segment and the finish road segment to generate a dense set of waypoints, the dense set of waypoints including the list of waypoints and the additional waypoints; weighting candidate road segments between the start road segment and the finish road segment, the candidate road segments including lane segments and lane segment groups; and creating the HD navigation route, the HD navigation route including path lane segments between the start road segment and the finish road segment.

Example 3: The method of example 2, wherein the HD navigation route is created in reverse from the finish road segment to the start road segment.

Example 4: The method of example 3, wherein creating the HD navigation route comprises applying candidate matching logic to determine a correct road segment at mergers in the candidate road segments.

Example 5: The method of example 2 or 3, wherein the HD navigation route is created in a forward manner from the start road segment to the finish road segment.

Example 6: The method of any of examples 2 through 5, wherein: identifying the finish road segment of the HD navigation route comprises starting with a last waypoint in the list of waypoints and iterating backward through the list of waypoints to identify a finish lane segment that includes coordinates of a waypoint in the list of waypoints; and identifying the start road segment of the HD navigation route comprises starting a first waypoint in the list of waypoints and iterating forward through the list of waypoints to identify a start lane segment that includes coordinates of another waypoint in the list of waypoints.

Example 7: The method of any of examples 2 through 6, wherein interpolating the list of waypoints comprises applying linear interpolation or cubic interpolation across coordinates of the list of waypoints to generate the dense set of waypoints.

Example 8: The method of example 7, wherein a spacing between waypoints in the dense set of waypoints is configured to be less than half a length of a shortest candidate road segment among the candidate road segments.

Example 9: The method of any of examples 2 through 8, wherein weighting candidate road segments comprises iterating through each waypoint in the dense set of waypoints and accumulating a number of waypoints geometrically contained within each lane segment and each lane segment group in the candidate road segments.

Example 10: The method of any of examples 2 through 9, wherein the HD navigation route includes a sequential list of the lane segments from a starting point to a finish point of the navigation route.

Example 11: The method of any preceding example, wherein the SD map database is installed in the host vehicle.

Example 12: The method of any preceding example, wherein the SD map database is located remote from the host vehicle and the navigation route is communicated, via wireless communication, to the host vehicle.

Example 13: The method of any preceding example, wherein the SD map database is located on a mobile device and the navigation route is communicated, via wireless communication, to the host vehicle.

Example 14: The method of any preceding example, wherein the HD map database is installed in the host vehicle and includes road segment data for roads of a particular region, the road segment data comprising at least lane segments, lane segment groups, and associated connectivity data for the particular region.

Example 15: The method of any preceding example, wherein the HD map database is located remote from the host vehicle and the HD navigation route is communicated, via wireless communication, to the host vehicle.

Example 16: A computer-readable storage medium comprising computer-executable instructions that, when executed, cause a processor in a host vehicle to perform the method of any preceding example.

Example 17: A system comprising a processor configured to perform the method of any of examples 1 through 15.

CONCLUSION

While various embodiments of the disclosure are described in the preceding description and shown in the drawings, it is to be understood that this disclosure is not limited to it but may be variously embodied to practice within the scope of the following claims. From the preceding description, it will be apparent that various changes may be made without departing from the spirit and scope of the disclosure as defined by the following claims.

What is claimed is:

1. A method comprising:
receiving, from a standard-definition (SD) map database, a navigation route for a host vehicle, the navigation route including a list of waypoints, the list of waypoints including a start waypoint, intermediate waypoints, and a finish waypoint;
responsive to receiving the navigation route, matching the list of waypoints to lane geometry data maintained in a high-definition (HD) map database by:
identifying a finish road segment in the HD map database that contains coordinates of a first respective waypoint, the first respective waypoint comprising the finish waypoint or a first other waypoint among the list of waypoints;
identifying a start road segment in the HD map database that contains coordinates of a second respective waypoint, the second respective waypoint comprising the start waypoint or a second other waypoint among the list of waypoints;
interpolating the list of waypoints between the start road segment and the finish road segment to generate a dense set of waypoints, the dense set of waypoints including the list of waypoints and additional waypoints;
for road segments within the HD map database between the start road segment and the finish road segment, determining candidate road segments by identifying one or more waypoints within the dense set of waypoints geometrically contained within each candidate road segment, the candidate road segments including candidate lane segment groups and candidate lane segments within each candidate lane segment group; and
creating a HD navigation route that includes the candidate lane segment groups and the candidate lane segments between the start road segment and the finish road segment, the HD navigation route including the dense set of waypoints, the candidate lane segment groups, and the candidate lane segments;

outputting, to a vehicle controller, the HD navigation route; and operating, with the vehicle controller, the host vehicle in a roadway environment along the HD navigation route.

2. The method of claim 1, wherein the HD navigation route is created in reverse from the finish road segment to the start road segment.

3. The method of claim 2, wherein creating the HD navigation route comprises applying candidate matching logic to determine a correct road segment at mergers in the candidate road segments.

4. The method of claim 1, wherein the HD navigation route is created in a forward manner from the start road segment to the finish road segment.

5. The method of claim 1, wherein:
identifying the finish road segment of the HD navigation route comprises starting with the finish waypoint in the list of waypoints and iterating backward through the list of waypoints to identify a finish lane segment that includes coordinates of a waypoint in the list of waypoints; and
identifying the start road segment of the HD navigation route comprises starting with the start a first waypoint in the list of waypoints and iterating forward through the list of waypoints to identify a start lane segment that includes coordinates of another waypoint in the list of waypoints.

6. The method of claim 1, wherein interpolating the list of waypoints comprises applying linear interpolation or cubic interpolation across coordinates of the list of waypoints to generate the dense set of waypoints.

7. The method of claim 6, wherein a spacing between waypoints in the dense set of waypoints is configured to be less than half a length of a shortest candidate road segment among the candidate road segments.

8. The method of claim 1, wherein determining the candidate road segments comprises iterating through each waypoint in the dense set of waypoints and accumulating a number of waypoints geometrically contained within each lane segment and each lane segment group in the candidate road segments.

9. The method of claim 1, wherein the HD navigation route includes a sequential list of the lane segments from a starting point to a finish point of the navigation route.

10. The method of claim 1, wherein the SD map database is installed in the host vehicle.

11. The method of claim 1, wherein the SD map database is located remote from the host vehicle and the navigation route is communicated, via wireless communication, to the host vehicle.

12. The method of claim 1, wherein the SD map database is located on a mobile device and the navigation route is communicated, via wireless communication, to the host vehicle.

13. The method of claim 1, wherein the HD map database is installed in the host vehicle and includes road segment data for roads of a particular region, the road segment data comprising at least lane segments, lane segment groups, and associated connectivity data for the particular region.

14. The method of claim 1, wherein the HD map database is located remote from the host vehicle and the HD navigation route is communicated, via wireless communication, to the host vehicle.

15. A non-transitory computer-readable storage medium comprising computer-executable instructions that, when executed, cause a processor in a host vehicle to:
receive, from a standard-definition (SD) map database, a navigation route for the host vehicle, the navigation route including a list of waypoints, the list of waypoints including a start waypoint, intermediate waypoints, and a finish waypoint;
responsive to reception of the navigation route, match the list of waypoints to lane geometry data maintained in a high-definition (HD) map database by:
identifying a finish road segment in the HD map database that contains coordinates of a first respective waypoint, the first respective waypoint comprising the finish waypoint or a first other waypoint among the list of waypoints;
identifying a start road segment in the HD map data database that contains coordinates of a second respective waypoint, the second respective waypoint comprising the start waypoint or a second other waypoint among the list of waypoints;
interpolating the list of waypoints between the start road segment and the finish road segment to generate a dense set of waypoints, the dense set of waypoints including the list of waypoints and additional waypoints;
for road segments within the HD map database between the start road segment and the finish road segment, determining candidate road segments by identifying one or more waypoints within the dense set of waypoints geometrically contained within each candidate road segment, the candidate road segments including candidate lane segment groups and candidate lane segments within each candidate lane segment group; and
creating a HD navigation route that includes the candidate lane segment groups and the candidate lane segments between the start road segment and the finish road segment, the HD navigation route including the dense set of waypoints, the candidate lane segment groups, and the candidate lane segments;
output, to a vehicle controller of the host vehicle, the HD navigation; and
operate, with the vehicle controller, the host vehicle in a roadway environment along the HD navigation route.

16. The non-transitory computer-readable storage medium of claim 15, wherein:
identifying the finish road segment of the HD navigation route comprises starting with the finish waypoint in the list of waypoints and iterating backward through the list of waypoints to identify a finish lane segment that includes coordinates of a waypoint in the list of waypoints; and
identifying the start road segment of the HD navigation route comprises starting with the start waypoint in the list of waypoints and iterating forward through the list of waypoints to identify a start lane segment that includes coordinates of another waypoint in the list of waypoints.

17. The non-transitory computer-readable storage medium of claim 15, wherein interpolating the list of waypoints comprises applying linear interpolation or cubic interpolation across coordinates of the list of waypoints to generate the dense set of waypoints.

18. A system comprising a processor configured to:
receive, from a standard-definition (SD) map database, a navigation route for a host vehicle, the navigation route including a list of waypoints, the list of waypoints including a start waypoint, intermediate waypoints, and a finish waypoint;

responsive to reception of the navigation route, match the list of waypoints to lane geometry data maintained in a high-definition (HD) map database by:
identifying a finish road segment in the HD map database that contains coordinates of a first respective waypoint, the first respective waypoint comprising the finish waypoint or a first other waypoint among the list of waypoints;
identifying a start road segment in the HD map data database that contains coordinates of a second respective waypoint, the second respective waypoint comprising the start waypoint or a second other waypoint among the list of waypoints;
interpolating the list of waypoints between the start road segment and the finish road segment to generate a dense set of waypoints, the dense set of waypoints including the list of waypoints and additional waypoints;
for road segments within the HD map database between the start road segment and the finish road segment, determining candidate road segments by identifying one or more waypoints within the dense set of waypoints geometrically contained within each candidate road segment, the candidate road segments including candidate lane segment groups and candidate lane segments within each candidate lane segment group; and
creating a HD navigation route that includes the candidate lane segment groups and the candidate lane segments between the start road segment and the finish road segment, the HD navigation route including the dense set of waypoints, the candidate lane segment groups, and the candidate lane segments;

output, to a vehicle controller of the host vehicle, the HD navigation route; and operate, with the vehicle controller, the host vehicle in a roadway environment along the HD navigation route.

19. The system of claim 18, wherein the processor is further configured to:
identify the finish road segment of the HD navigation route by starting with the finish waypoint in the list of waypoints and iterating backward through the list of waypoints to identify a finish lane segment that includes coordinates of a waypoint in the list of waypoints; and
identify the start road segment of the HD navigation route comprises by starting with the start waypoint in the list of waypoints and iterating forward through the list of waypoints to identify a start lane segment that includes coordinates of another waypoint in the list of waypoints.

20. The system of claim 18, wherein the processor is further configured to:
interpolate the list of waypoints by applying linear interpolation or cubic interpolation across coordinates of the list of waypoints to generate the dense set of waypoints.

* * * * *